United States Patent [19]
Lundström

[11] Patent Number: 5,979,631
[45] Date of Patent: Nov. 9, 1999

[54] DEVICE FOR TRANSMITTING TORQUE BETWEEN TWO ROTATABLE SHAFTS

[75] Inventor: Bo Lundström, Glumslöv, Sweden

[73] Assignee: Haldex Traction, AB, Landskrona, Sweden

[21] Appl. No.: 09/000,123

[22] PCT Filed: Jul. 11, 1996

[86] PCT No.: PCT/SE96/00937

§ 371 Date: Jun. 1, 1998

§ 102(e) Date: Jun. 1, 1998

[87] PCT Pub. No.: WO97/04245

PCT Pub. Date: Feb. 6, 1997

[30] Foreign Application Priority Data

Jul. 14, 1995 [SE] Sweden ................................ 9502603

[51] Int. Cl.[6] .................... F16D 43/284; B60K 17/35
[52] U.S. Cl. ................... 192/85 CA; 192/103 F
[58] Field of Search .................... 192/103 F, 85 CA, 192/54.3, 35, 59, 57; 475/88

[56] References Cited

U.S. PATENT DOCUMENTS

| | | | |
|---|---|---|---|
| 4,012,968 | 3/1977 | Kelbel | 192/85 AA X |
| 5,046,595 | 9/1991 | Sumiyoshi et al. | 192/103 F X |
| 5,070,975 | 12/1991 | Tanaka et al. | 192/35 |
| 5,087,228 | 2/1992 | Johansson | 192/59 X |
| 5,103,642 | 4/1992 | Suzuki et al. | 192/59 X |
| 5,358,455 | 10/1994 | Lundstrom | 475/101 |
| 5,405,293 | 4/1995 | Severinsson | 192/103 F X |
| 5,469,950 | 11/1995 | Lundstrom et al. | 192/103 F X |

*Primary Examiner*—Rodney H. Bonck
*Attorney, Agent, or Firm*—James Ray & Associates

[57] ABSTRACT

Torque is transmitted between two rotatable, coaxial shaft members in a stationary housing which includes a number of alternate clutch discs connected to the shaft members and engageable to counteract differential rotational speed therebetween, and a hydraulic arrangement driven by the speed differential. The arrangement includes a number of pistons which are axially movable in the housing and are intended to create a hydraulic pressure in the arrangement and thereby to engage the clutch discs, piston actuating devices engaging a shaft member via cams, so as to impart to the pistons a reciprocating movement, and a closed hydraulic system connecting cylinders at all pistons with a hydraulic line containing check-valves. Oil is supplied to the system with a pump and may be removed from the system via an overflow valve.

5 Claims, 2 Drawing Sheets

DEVICE FOR TRANSMITTING TORQUE BETWEEN TWO ROTATABLE SHAFTS

TECHNICAL FIELD

The present invention relates to a device for transmitting torque between two rotatable, coaxial shaft members in a stationary housing, the device containing a number of alternate clutch discs, connected to the two shaft members and engageable to counteract differential rotational speed between the shaft members, and a hydraulic arrangement, driven by the speed differential between the two shaft members and including

- a number of concentrical, ring-shaped pistons, which are axially movable in the housing coaxially with the shaft members and are intended to create a hydraulic pressure in the arrangement and thereby to engage the clutch discs at a differential rotational speed between the two shaft members,
- piston actuating members rotatable with one of the shaft members and engaging the other of the shaft members via cams, which are angularly offset in relation to each other, so as to impart to the pistons a reciprocating movement at a differential rotational speed between the shaft members, and
- a hydraulic line system connecting the cylinders at all pistons by means of hydraulic lines containing check-valves.

BACKGROUND OF THE INVENTION

A device of the kind described above is known through our own EP-A-94200571.1, to which reference is made for further information about the technical field and certain features common for this prior device and the device according to the present invention. With this known device it has become possible to obtain a reasonably even or non-fluctuating differential rotational speed decrease or braking action in the device. With one embodiment of the prior device it is also possible to obtain the desired, even action also in a second rotational direction, i e in the reverse gear, if the device is used as a so called differential brake in a connection between the front and the rear axle of a road vehicle.

However, a supply piston in the hydraulic arrangement of the prior device is spring biassed into engagement with its cam, and the hydraulic system itself is of the open type, sucking oil from a reservoir and delivering it back after use in the system.

A drawback with this device is that it is impossible to obviate or switch-off its action, which for example means that towing away of a vehicle provided with such a device is very difficult. A present requirement on a device of the kind referred to is that it shall make a towing away at a speed of 50 km/h possible.

THE INVENTION

This may according to the invention be attained in that the hydraulic line system is a closed system and in that oil is supplied to the system from a reservoir by means of a pump and may be removed from the system to the reservoir via an overflow valve. There is no spring bias on any piston in the device.

By switching off the pump or rather its motor, which is done by means of the ignition key of the vehicle, the clutch discs in the device will not be imparted any braking force at towing, and there is no risk for burnt clutch discs.

The pump motor may have a very low power consumption, and in a practical case it only provides some 3% of the maximum working pressure.

In order to control the device, the hydraulic line system is provided with an electrically controlled throttle valve.

In order to level out certain variations in the hydraulic flow, the hydraulic line system may be provided with an accumulator.

It is of the greatest importance that the function of the device is as smooth as possible.

This is in a first practical embodiment, in which a cam disc provided with a circular cam curve is arranged to engage the clutch discs and in which a thrust washer in engagement with the housing over a needle bearing is arranged at the opposite side of the clutch discs, obtained in that four piston actuating members are in engagement with the cam curve of the cam disc for imparting to four pistons a reciprocating movement at a differential rotational speed between the shaft members.

In this embodiment all reaction forces are used to engage the clutch discs.

In a second embodiment of the same general design one piston actuating member is in engagement with the cam curve of the cam disc, whereas two piston actuating members are in engagement with a circular cam curve on an axial end surface of a hub on the first shaft member for imparting to three pistons a reciprocating movement at a differential rotational speed between the shaft members, the hub engaging the thrust washer.

In this embodiment only the reaction force from the first piston is used to engage the clutch discs, whereas the reaction forces from the two other pistons are transferred to the housing via the hub and the thrust washer.

BRIEF DESCRIPTION OF THE DRAWINGS

The invention will be described in further detail below reference being made to the accompanying drawings, in which.

DESCRIPTION OF PREFERRED EMBODIMENTS

Figure 1:
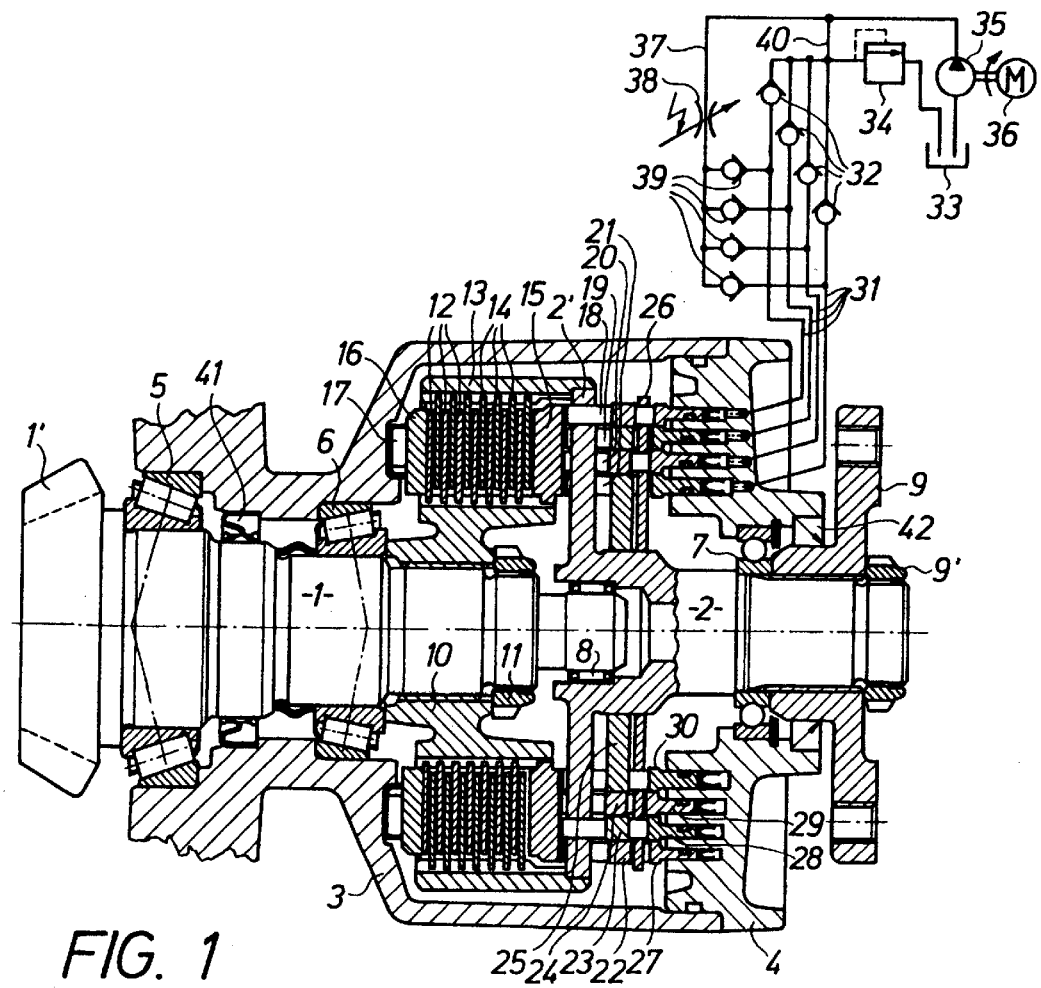
FIG. 1 is a section through a first embodiment of a differential brake according to the invention.

As shown in FIG. 1, a first shaft 1 to the left in the drawing and a second shaft 2 to the right in the drawing are rotatably journalled in a housing 3 with a cover 4. The first shaft 1 is journalled by means of bearings 5 and 6 and the second shaft by means of a bearing 7. There is also a bearing 8 between the two shafts 1 and 2, as shown.

The two shafts 1 and 2 may be connected to other machine elements, for example in a vehicle. This is illustrated by providing the first shaft 1 with a gear 1' and the second shaft 2 with an attachment flange 9, held in position by means of a lock nut 9'. The arrangement is such that no relative axial movements will occur or be permitted between the two shafts 1 and 2.

A hub 10 is attached to the first shaft 1 and secured by means of a lock nut 11. The first shaft 1 and the hub 10 together constitute a first shaft member.

A number of alternate clutch discs or rings 12 are externally splined to the hub 10.

The second shaft 2 is provided with a radial flange 2', and a sleeve 13 is attached thereto. The shaft 2 with its flange 2' and the sleeve 13 together constitute a second shaft member.

A number of alternate clutch discs or rings 14 corresponding to the clutch discs 12 are internally splined to the sleeve 13. When engaged, the clutch discs 12, 14 will counteract differential rotational speed between the two shaft members.

A cam disc 15 is splined to the hub 10 to the right of the clutch discs 12, 14 in the drawing for their engagement in a way to be described, and the reaction force is taken up by the housing 3 via a thrust washer 16, which is positioned to the left of the clutch discs 12, 14 in the drawing, and an axial needle bearing 17, supported by the housing 3.

At its surface facing from the clutch discs 12, 14 the cam disc 15 is provided with a comparatively wide, circular cam curve, and four sets of cylindrical cam rollers 18–21 are arranged to cooperate with this cam curve. The cam rollers 18–21 are rotatably arranged in the radial flange 2' of the second shaft 2. These sets of cam rollers 18–21 are positioned in concentrical arrangements. The number of cam rollers in each set may vary but is three in the preferred embodiment, and there is a phase shift from one set to the next one, in the preferred embodiment amounting to 30°. The cam profile on the cam disc 15 is such that at rotation the cam rollers 18–21 will be imparted a movement whose axial speed is linearly changed with the relative rotational angle between the shafts 1 and 2.

Thrust washers 22–25 are in engagement with the cam rollers 18–21. These thrust washers 22–25 are concentrical and rotatable independently of each other, the innermost thrust washer 25 being in rotational engagement with the second shaft 2.

An axial roller bearing 26 having four concentric roller sets axially movable independently of each other is arranged on the second shaft 2 in engagement with on one hand the thrust washers 22–25 and on the other hand four concentrical, ring-shaped pistons 27–30, which are axially movable in corresponding ring-shaped cylinders in the housing cover 4 and are provided with sealings. The different pistons 27–30 have the same piston areas, which means that with the decreasing diameter from the outermost piston 27 to the innermost piston 30 their radial widths increase correspondingly.

Under conditions recited below, the result of the described arrangement is that the pistons 27–30 will be imparted axially reciprocating movements, when the two shafts 1 and 2 have a differential rotational speed.

A hydraulic line 31 is connected to each of the ring-shaped cylinders for the pistons 27–30. Each such hydraulic line 31 is provided with a check valve 32, and thereafter the lines 31 are connected to each other and lead to an overflow line 40 and further to a hydraulic line 37. This line leads to an electrically controlled throttle valve 38 and is then branched-off and leads via check valves 39 to the four hydraulic lines 31 to the ring-shaped cylinders in the housing cover 4. This hydraulic system is a closed system.

The hydraulic line 31 is also connected to an oil reservoir 33 via an overflow valve 34, for example adjusted to a pressure of 3 bar. Oil from the reservoir 33 is pumped by means of a pump 35, driven by means of an electric motor 36 (with a power of for example 10 W), to the hydraulic line 37. The purpose of the pump 35 is to establish a certain working pressure in the closed hydraulic system. As will appear below, the system will not be able to function as intended without this system pressure.

The purpose of the electrically controlled throttle valve 38 is to control the working pressure in the closed hydraulic system and thus to control the force with which the differential rotational speed will be counteracted.

For the sake of clarity, the closed hydraulic circuit comprising the parts 31–40 is shown as being arranged outside the housing 3, 4. In reality it is arranged within the housing, which in itself functions as the reservoir 33. Hereby the different parts within the housing 3, 4 will obtain a satisfactory lubrication, and the housing is provided with sealings 41 and 42.

When the described hydraulic system is under pressure, so that the pistons 27–30 are held against the roller bearing 26 with a certain force, a rotational speed differential between the two shafts 1 and 2 will effect a reciprocal movement of the pistons 27–30, as the cam rollers 18–21 roll on the cam curves of the cam disc 15. The frequency of the reciprocal movements increases with increasing rotational speed differential.

When the pistons 27–30 move in the direction away from the cam disc 15 or to the right in FIG. 1, a net flow through the throttle valve 38 will be attained (through the check valves 39, the lines 31, the check valves 32, and the lines 40 and 37). The flow from each piston is proportional to its axial speed, and the resulting flow from all the pistons 27–30 is proportional to the rotational speed differential between the two shafts 1 and 2.

When there is a flow through the throttle valve 38, a counter-pressure will appear at the outlet side of the cylinders for the pistons 27–30. This counter-pressure is a function of the flow (increased flow, increased counter-pressure—proportional, progressive, degressive connection depends on the valve design). Each piston 27–30 which moves from the cam disc 15 transmits an axial force proportional to the pressure and the piston area to the cam disc 15 and thus to the clutch discs or rings 12 and 14, so that the rotational speed differential between the two shafts 1 and 2 is decreased.

Figure 2:
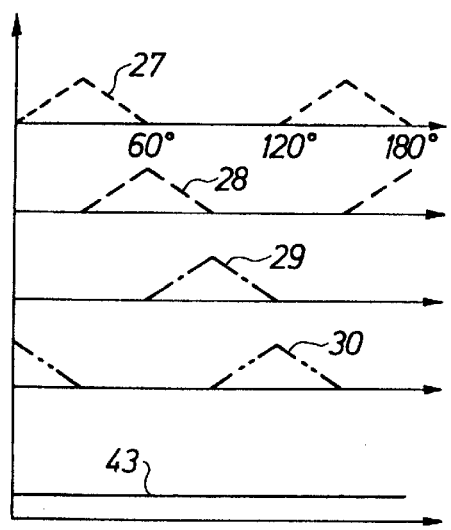
FIG. 2 is a diagram illustrating the operation of the differential brake according to FIG. 1.

The function of the device described above having three cam rollers in each set of cam rollers 18–20 and three evenly distributed cams on the cam disc 15 is illustrated in FIG. 2. In the diagram of FIG. 2, the oil flow at each piston 27–30 as well as the total oil flow 43 as a function of the rotation angle 0–180° is depicted. As the flow at each piston has the same appearance and there is a 30° phase shift from one piston to the next one due to the design of the device, the total flow 43 can be depicted as a straight line, which in other words means that the braking action tending to decrease the rotational speed differential is even.

As long as the motor 36 is switched on, so that the pump 35 works, the described differential brake will function as described. However, if the motor 36 is switched off by means of the ignition key of the vehicle, the differential brake will cease to function. In this way towing of the vehicle will become possible without damages to the differential brake.

Figure 3:
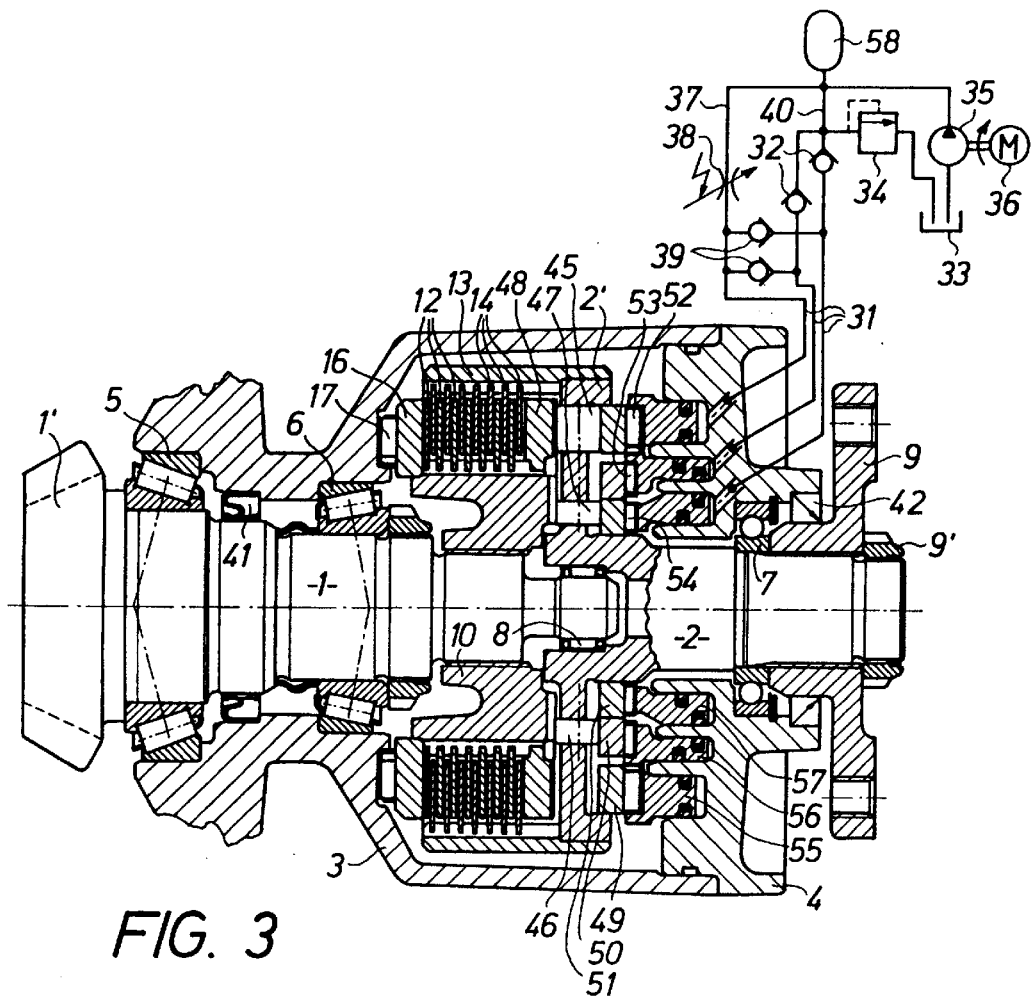
FIG. 3 is a section through a second embodiment of a differential brake according to the invention.

A second embodiment of a differential brake according to the invention is shown in FIG. 3. In this embodiment certain elements are so similar to corresponding elements in the first embodiment according to FIG. 1 that the same reference numerals have been used. This is true for the first shaft 1 with its gear 1', the second shaft 2 with its flange 2', the housing 3 with its cover 4, the bearings 5–8, the attachment flange 9 with its lock nut 9', the hub 10, the alternate clutch discs or rings 12 and 14, the sleeve 13, the thrust washer 16, the needle bearing 17, the hydraulic lines 31 and 37, the check valves 32 and 39, the reservoir 33, the overflow valve 34, the pump 35 with its motor 36, the throttle valve 38, the overflow line 40, and the sealings 41 and 42.

In this second embodiment only three sets of cylindrical cam rollers 45–47 are rotatably arranged in the radial flange 2' of the second shaft 2. The outermost cam rollers 45 cooperate with a circular cam curve on a cam disc 48, corresponding to the cam disc 15 in the first embodiment and splined to the hub 10 on the first shaft 1. The two remaining sets of cam rollers 46 and 47 cooperate with a circular cam curve on the axial end surface of the hub 10. As in the first embodiment according to FIG. 1 there is a phase shift from one set to the next one, in the preferred embodiment amounting to 30°.

Concentrical thrust washers 49–51 are in engagement with the respective cam rollers 45–47, and in engagement with the respective thrust washers 49–51 are roller bearings 52–54 arranged at the ends of three concentrical, ring-shaped pistons 55–57, axially movable in corresponding ring-shaped cylinders in the housing cover 4 and provided with sealings.

The two inner pistons 56 and 57 cooperating with the hub 10 have the same piston area, whereas the outermost piston 55 cooperating with the cam disc 48 has a different piston area, preferably a greater area.

The pump 35 has the same function as in the previous embodiment according to FIG. 1. In this second embodiment according to FIG. 3, however, there is added an accumulator 58 for levelling out variations in the flow to the pistons 55–57. As will appear below, the flow from the three pistons is proportional to the rotational speed differential between the shafts 1 and 2.

The two inner pistons 56 and 57 contribute with a net flow by means of the check valves 32 and 39 in analogy with the first embodiment according to FIG. 1, but the axial force is not transmitted via clutch discs but rather via the bearings 53, 54, the thrust washers 50, 51, the cam rollers 46, 47, the hub 10 and the thrust washer 16 to the housing 3. The outermost piston 55 on the other hand transmits its axial force to the clutch discs 12 and 14 via the cam disc 48. This piston 55 does not contribute to the net flow but has a levelling function in relation to the other pistons 56 and 57.

Figure 4:
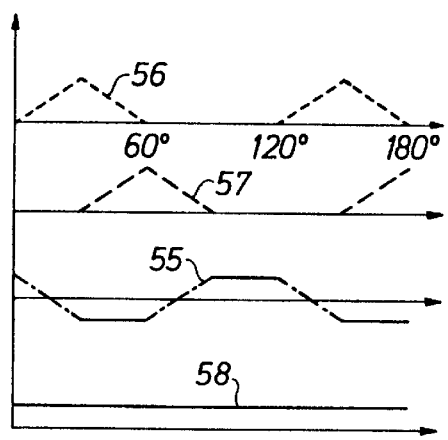
FIG. 4 is a diagram illustrating the operation of the differential brake according to FIG. 3.

The contribution to the net flow from the respective pistons as a function of the relative rotational angle between the shafts 1 and 2 at a constant rotational speed differential is shown in FIG. 4. The curves are symmetrical, and the function is independent of the rotational direction. Also in this embodiment the total flow 58 can be depicted as a straight line, which means that the braking action tending to decrease the rotational speed differential is even.

I claim:

1. A device for transmitting torque between two rotatable, coaxial shaft members (1, 2) in a stationary housing (3, 4), the device containing a number of alternate clutch discs (12, 14), connected to the two shaft members and engageable to counteract differential rotational speed between the shaft members, and a hydraulic arrangement, driven by the speed differential between the two shaft members and including a number of concentrical, ring-shaped pistons (27–30; 55–57), which are axially movable in the housing coaxially with the shaft members and are intended to create a hydraulic pressure in the arrangement and thereby to engage the clutch discs at a differential rotational speed between the shaft members, piston actuating members (18–21; 45–47) rotatable with one of the shaft members (2) and engaging the other of the shaft members (1) via cams, which are angularly offset in relation to each other, so as to impart to the pistons a reciprocating movement at a differential rotational speed between the shaft members, and a hydraulic line system connecting the cylinders at all pistons by means of hydraulic lines (31, 37, 40) containing check-valves (32, 39), characterized in that the hydraulic line system (31, 32, 37, 39, 40) is a closed system and in that oil is supplied to the system from a reservoir (33) by means of a pump (35) and may be removed from the system to the reservoir via an overflow valve (34).

2. A device according to claim 1, characterized in that the hydraulic line system (31, 32, 37, 39, 40) is provided with an electrically controlled throttle valve (38).

3. A device according to claim 1, characterized in that the hydraulic line system (31, 32, 37, 39, 40) is provided with an accumulator (58).

4. A device according to claim 1, in which a cam disc (15) provided with a circular cam curve is arranged to engage the clutch discs (12, 14) and in which a thrust washer (16) in engagement with the housing (3, 4) over a needle bearing (17) is arranged at the opposite side of the clutch discs, characterized in that four piston actuating members (18–21) are in engagement with the cam curve of the cam disc (15) for imparting to four pistons (27–30) a reciprocating movement at a differential rotational speed between the shaft members (1, 2).

5. A device according to claim 1, in which a cam disc (48) provided with a circular cam curve is arranged to engage the clutch discs (12, 14) and in which a thrust washer (16) in engagement with the housing (3, 4) over a needle bearing (17) is arranged at the opposite side of the clutch discs, characterized in that one piston actuating member (45) is in engagement with the cam curve of the cam disc (48) and two piston actuating members (46, 47) are in engagement with a circular cam curve on an axial end surface of a hub (10) on the first shaft member (1) for imparting to three pistons (55–57) a reciprocating movement at a differential rotational speed between the shaft members (1, 2), the hub engaging the thrust washer (16).

* * * * *